United States Patent
Yamada et al.

(10) Patent No.: US 8,581,202 B2
(45) Date of Patent: Nov. 12, 2013

(54) RADIATION DETECTION APPARATUS

(75) Inventors: Katsuya Yamada, Kamakura (JP);
Yasuaki Kawasaki, Otawara (JP);
Hiroshi Iwata, Otawara (JP)

(73) Assignees: Kabushiki Kaisha Toshiba, Tokyo (JP);
Toshiba Electron Tubes & Devices Co., Ltd., Otawara-shi (JP)

( * ) Notice: Subject to any disclaimer, the term of this patent is extended or adjusted under 35 U.S.C. 154(b) by 163 days.

(21) Appl. No.: 13/289,481

(22) Filed: Nov. 4, 2011

(65) Prior Publication Data

US 2012/0112084 A1    May 10, 2012

(30) Foreign Application Priority Data

Nov. 9, 2010   (JP) ................................. 2010-250674

(51) Int. Cl.
*G01T 1/24* (2006.01)

(52) U.S. Cl.
USPC ................................ 250/370.15; 250/370.09

(58) Field of Classification Search
USPC ....................................... 250/370.15, 370.09
See application file for complete search history.

(56) References Cited

U.S. PATENT DOCUMENTS

| | | | |
|---|---|---|---|
| 5,811,790 A | | 9/1998 | Endo et al. |
| 7,233,641 B2* | | 6/2007 | Hilderscheid et al. .......... 378/19 |
| 7,489,516 B2* | | 2/2009 | Lacey ........................... 361/759 |
| 7,626,173 B2* | | 12/2009 | Hackenschmied et al. ........................ 250/363.08 |
| 8,093,535 B2* | | 1/2012 | Heismann et al. ............ 219/494 |
| 8,366,319 B2* | | 2/2013 | Kawasaki et al. ............. 378/189 |
| 8,405,040 B2* | | 3/2013 | Luhta et al. .............. 250/370.15 |
| 2003/0043959 A1* | | 3/2003 | Wischmann et al. ........... 378/19 |
| 2006/0076500 A1* | | 4/2006 | Watanabe ................ 250/370.15 |
| 2009/0152472 A1* | | 6/2009 | Kim et al. ................ 250/370.15 |
| 2011/0049378 A1* | | 3/2011 | Omura ..................... 250/370.15 |

FOREIGN PATENT DOCUMENTS

| | | |
|---|---|---|
| JP | 2000-258541 | 9/2000 |
| JP | 2005-283262 | 10/2005 |
| WO | WO 2010/038877 A1 | 4/2010 |

* cited by examiner

*Primary Examiner* — Christine Sung
(74) *Attorney, Agent, or Firm* — Oblon, Spivak, McClelland, Maier & Neustadt, L.L.P.

(57) ABSTRACT

According to one embodiment, a radiation detection apparatus includes a radiation detection panel, a support member, a circuit board, a flexible circuit board, a housing, a connecting member, a thermally radiative member, and a thermally conductive member. The support member supports the radiation detection panel on one surface thereof. The circuit board is supported by other surface of the support member, and drives the radiation detection panel. The flexible circuit board electrically connects the radiation detection panel with the circuit board, and on which an integrated circuit is mounted. The housing has thermal insulation, and a part of which is provided with an opening. The connecting member is connected to the support member and the housing. The thermally radiative member is located outside the housing and extends through the opening. The thermally radiative member is opposed to the integrated circuit, and shields an electromagnetic field that leaks from the opening.

6 Claims, 3 Drawing Sheets

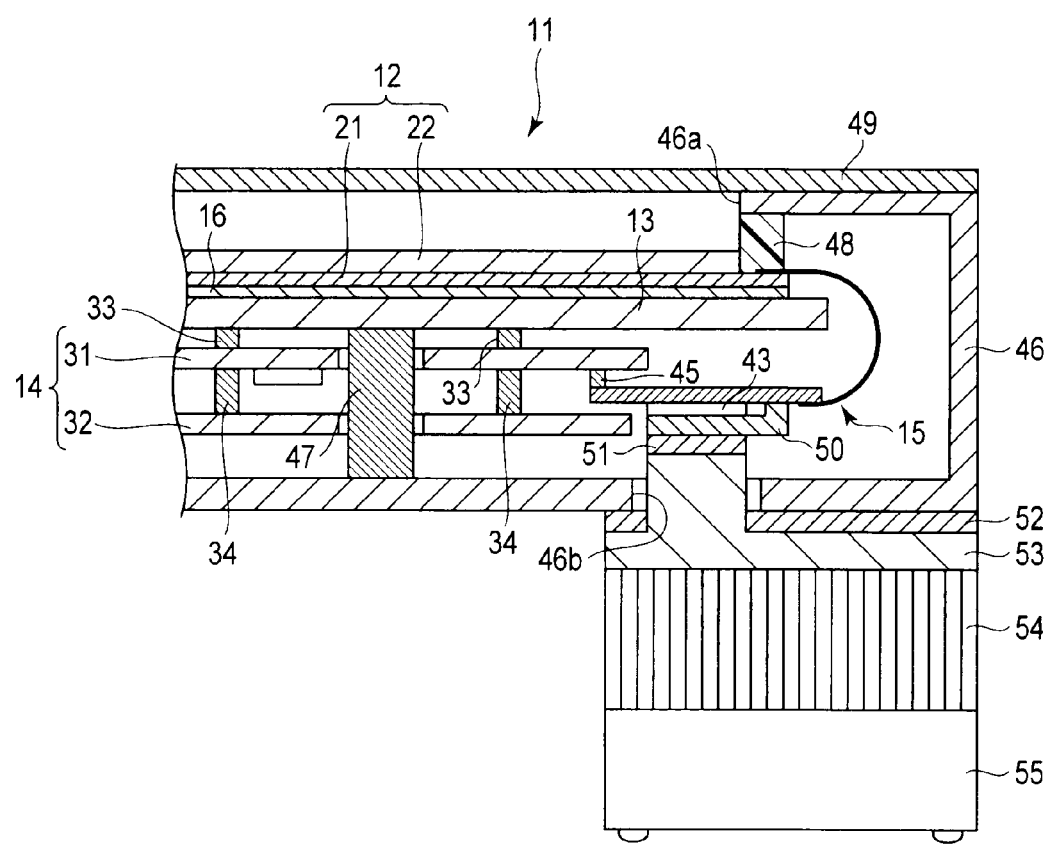
F I G. 1

RADIATION DETECTION APPARATUS

CROSS-REFERENCE TO RELATED APPLICATIONS

This application is based upon and claims the benefit of priority from prior Japanese Patent Application No. 2010-250674, filed Nov. 9, 2010, the entire contents of which are incorporated herein by reference.

FIELD

Embodiments described herein relate generally to a radiation detection apparatus.

BACKGROUND

In prior art, radiation detection apparatuses, in particular, X-ray detection apparatuses which detect X-rays have been used in various fields such as industrial nondestructive testing, medical diagnosis, and scientific research including structural analysis.

Among X-ray detection apparatuses, a high-sensitivity and a high-definition X-ray detection apparatus provided with an X-ray detection panel having a photodetector and a fluorescent layer has been known. The photodetector includes a photoelectric conversion element section in which a plurality of photosensors and a plurality of thin-film transistors (TFTs) are arranged in a two-dimensional manner. The fluorescent layer is directly formed on the photodetector. The fluorescent layer converts an X-ray into light which can be detected by the photoelectric conversion element section.

The X-ray detection panel is supported by one surface of a plate-shaped support member. A circuit board is supported by the other surface of the support member, and drives the X-ray detection panel. The X-ray detection panel and the circuit board are electrically connected to each other through a flexible circuit board. A detection integrated circuit is provided on the flexible circuit board, or at one end of the flexible circuit board.

When the X-ray detector is operated, the circuit board and the detection integrated circuit generate heat. A part of the generated heat is radiated into air inside a housing of the X-ray detection apparatus. However, most of the heat moves to members having a lower temperature based on heatconduction.

Therefore, the heat generated in the circuit board and the detection integrated circuit is conducted to the support member which supports the circuit board. In addition, the heat conducted to the support member is conducted to the X-ray detection panel having a lower temperature.

When the heat is conducted to the X-ray detection panel, a temperature of the X-ray detection panel increases, and an operation temperature becomes a high temperature. Then, a dark current of the photoelectric conversion element and a leakage current of the TFTs increase and an amount of fixed noise fluctuates, which results in a problem causing unevenness in an image.

The heat generation quantity of the whole detection integrated circuit is not uniform, nor is the heat generation quantity of part of the detection integrated circuit. The thermal conductivity of the whole detection integrated circuit is not uniform, nor is the thermal conductivity of part of the detection integrated circuit. Therefore, partial fluctuation occurs in the temperature of the X-ray detection panel. Thus, values of the dark current and the leakage current fluctuate, and the fixed noise changes in part of the X-ray detection panel.

To solve the above problem, a method of cooling the detection integrated circuit and the X-ray detection panel by using a cooling device has been proposed. As the cooling device, although there is a cooling device adopting a natural radiational cooling system, a peltier element or a cold-water circulation device is used in order to obtain sufficient cooling performance.

Further, a method of energizing the X-ray detection apparatus for 24 hours before use to make uniform a variation of the leakage current has been also proposed.

On the other hand, a method of releasing heat generated in the detection integrated circuit to the housing through a thermally conductive member has been proposed.

BRIEF DESCRIPTION OF THE DRAWINGS

FIG. 1 is a cross-sectional view of part of an X-ray detection apparatus according to an embodiment.

DETAILED DESCRIPTION

Figure 2:
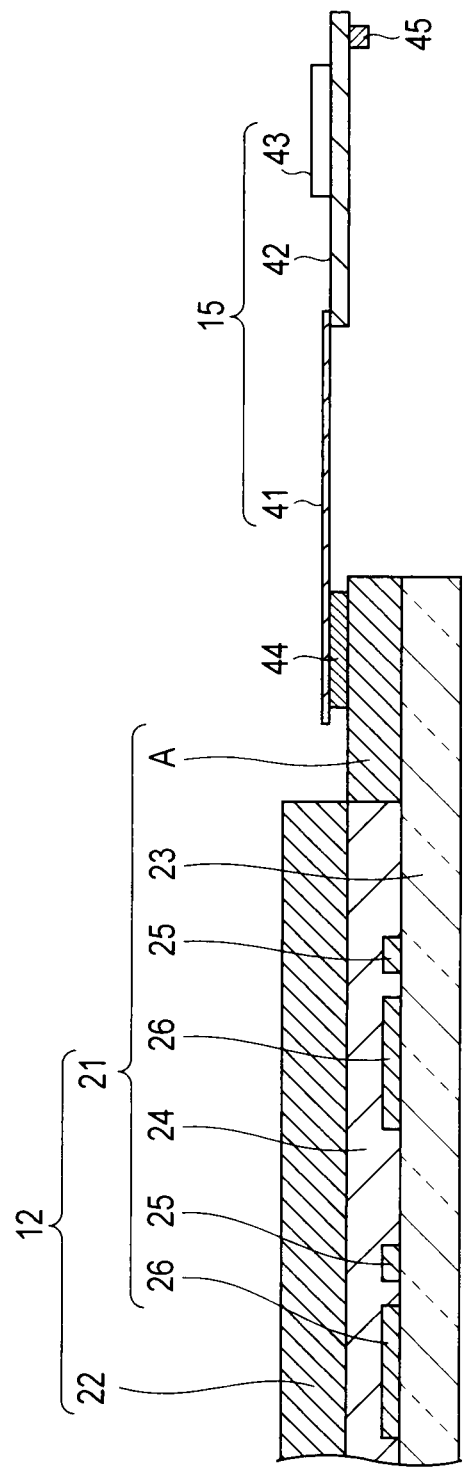
FIG. 2 is a cross-sectional view of the X-ray detection apparatus, in which part of an X-ray detection panel and a flexible circuit board illustrated in FIG. 1 are developed.

In general, according to one embodiment, there is provided a radiation detection apparatus comprising:

a radiation detection panel which detects a radiation;

a support member which supports the radiation detection panel on one surface thereof;

a circuit board which is supported by the other surface of the support member, and drives the radiation detection panel;

a flexible circuit board which electrically connects the radiation detection panel with the circuit board, and on which an integrated circuit is mounted;

a housing which accommodates the radiation detection panel, the support member, the circuit board, and the flexible circuit board, and has thermal conductivity, and a part of which is provided with an opening;

a connecting member which is accommodated in the housing, and connected to the support member and the housing;

a thermally radiative member which is located outside the housing and extends through the opening, the thermally radiative member being opposed to the integrated circuit, and shielding an electromagnetic field that leaks from the opening;

a heat insulation member which is held between the thermally radiative member and the housing; and a thermally conductive member which is held between the integrated circuit and the thermally radiative member.

According to another embodiment, there is provided a radiation detection apparatus comprising:

a radiation detection panel which detects a radiation;

a support member which supports the radiation detection panel on one surface thereof;

a circuit board which is supported by the other surface of the support member, and drives the radiation detection panel;

a flexible circuit board which electrically connects the radiation detection panel with the circuit board, and on which an integrated circuit is mounted;

a housing which accommodates the radiation detection panel, the support member, the circuit board, and the flexible circuit board, and has thermal insulation, and a part of which is provided with an opening;

a connecting member which is accommodated in the housing, and connected to the support member and the housing;

a thermally radiative member which is located outside the housing and extends through the opening, the thermally radiative member being opposed to the integrated circuit, and shielding an electromagnetic field that leaks from the opening; and a thermally conductive member which is held between the integrated circuit and the thermally radiative member.

An X-ray detection apparatus 11 according to an embodiment will be explained in detail hereinafter, with reference to drawings. The X-ray detection apparatus 11 is configured to detect an X-ray image formed when an X-ray is radiated from an X-ray irradiation module (not shown) enters through a subject, generate an analog signal indicative of the X-ray image, and convert the analog signal into a digital signal.

FIG. 1 is a cross-sectional view illustrating part of the X-ray detection apparatus 11.

As illustrated in FIG. 1, the X-ray detection apparatus 11 comprises an X-ray detection panel 12 serving as a radiation detection panel, a plate-shaped support member 13, circuit board group 14, a flexible circuit board 15, a housing 46, a connecting member 47, a detection integrated circuit 43, a shielding plate 50, a thermally conductive member 51, and a thermally radiative member 53.

The support member 13 supports the X-ray detection panel 12 on one surface thereof. The support member 13 has electrical conductivity. The circuit board group 14 is supported by the other surface of the support member 13, and electrically drives the X-ray detection panel 12. The flexible circuit board 15 electrically connects the X-ray detection panel 12 with the circuit board group 14.

The housing 46 accommodates the X-ray detection panel 12, the support member 13, the circuit board group 14, the flexible circuit board 15, the connecting member 47, the detection integrated circuit 43, the shielding plate 50, and the thermally conductive member 51. The housing 46 includes an opening 46a which is formed in a position opposed to the X-ray detection panel 12. The housing 46 also includes an opening 46b which is formed in a part opposed to the detection integrated circuit 43. In the present embodiment, the housing 46 has thermal conductivity.

A plurality of spacers 33 are connected to an analog circuit board 31 and the support member 13, and have electrical conductivity and thermal conductivity. A plurality of spacers 34 are connected to the analog circuit board 31 and a digital circuit board 32, and have electrical conductivity and thermal conductivity. The spacers 33 and the spacers 34 are stacked on multiple stages.

The analog circuit board 31 is electrically connected to the support member 13 through the spacers 33. The digital circuit board 32 is electrically connected to the support member 13 through the spacers 34, the analog circuit board 31, and the spacers 33. The spacers 33 and the spacers 34 may be formed as one unitary piece, and directly connected to the digital circuit board 32.

Therefore, the standard potentials of the analog circuit board 31, the digital circuit board 32, and the support member 13 can be made equal to each other.

The connecting member 47 is connected to the support member 13 and the housing 46. The connecting member 47 extends through an opening of the analog circuit board 31 and an opening of the digital circuit board 32. The connecting member 47 may extend through a part in which neither the analog circuit board 31 nor the digital circuit board 32 is disposed.

As described above, the circuit board group 14 and the support member 13 are electrically connected to each other. The circuit board group 14 and the support member 13 have the same standard potential. Therefore, it is possible to suppress mixing of noise into a signal (detection signal) of the circuit board group 14, which may occur when a difference occurs between the standard potential of the circuit board group 14 and the potential of the support member 13.

Besides, in the present embodiment, the connecting member 47 is driven into the support member 13. The means for connecting the connecting member 47 to the support member 13 may be variously modified. For example, the connecting member 47 may be connected to the support member 13 by welding.

Figure 3:
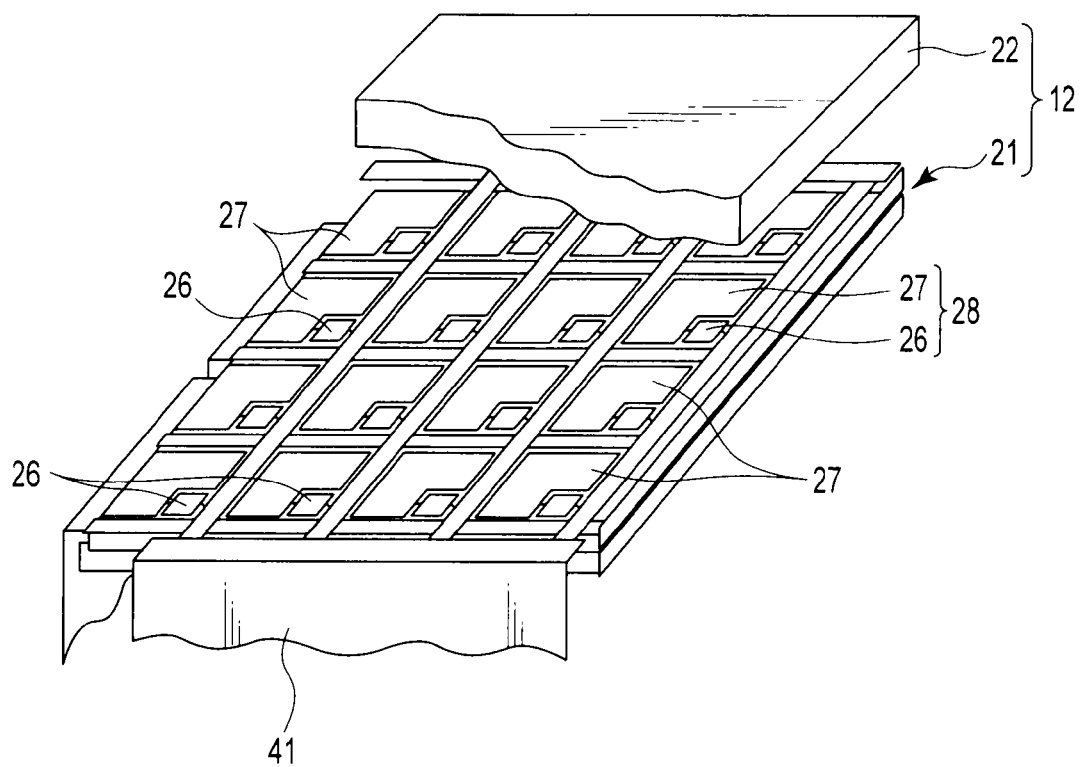
FIG. 3 is an exploded perspective of part of the X-ray detection apparatus according to the embodiment, in which part of the X-ray detection panel is cut away.

As illustrated in FIG. 1, FIG. 2, and FIG. 3, the X-ray detection panel 12 includes a photodetector 21, and a fluorescent layer 22 which is directly formed on the photodetector 21. The fluorescent layer 22 is located on an X-ray-incident side of the photodetector 21. The fluorescent layer 22 converts the X-ray into light which can be detected by the photodetector 21.

The photodetector 21 includes a glass substrate 23, a plurality of wiring sections 25, a plurality of thin-film transistors (TFTs) 26, a charge extracting section (electrode pad section) A, and a photosensor 24. The photosensor 24 includes a plurality of photodiodes 27.

Photoelectric conversion element sections 28 are formed on the glass substrate 23 in a two-dimensional manner. Specifically, the photoelectric conversion element sections 28 are formed in a matrix manner on the glass substrate 23. Each photoelectric conversion element section 28 is formed of the photodiode 27 and the TFT 26. The photodiode 27 converts light obtained by conversion by the fluorescent layer 22 into an electrical signal. The electrical signal which is obtained by conversion by the photodiode 27 is supplied to the TFT 26.

The wiring sections 25 are formed on the glass substrate 23, and connected to the TFTs 26. The charge extracting section A is formed in an outer edge part of the glass substrate 23. The charge extracting section A is connected to the wiring sections 25.

The circuit board group 14 includes a control board (not shown), the analog circuit board 31, the digital circuit board 32, a power supply circuit board (not shown), and others. The control board is configured to control the X-ray detection panel. The analog circuit board 31 has at least one of a function of receiving an analog signal from the flexible circuit board 15, a function of processing the analog signal, and a function of converting the analog signal into a digital signal.

The digital circuit board 32 has at least one of a function of controlling the other boards, and a function of communicating with the outside of the X-ray detector 11. The power supply circuit board is configured to supply electrical energy to the other boards.

The circuit board group 14 is supported by the spacers 33 and the spacers 34, in a state of being apart from the other surface of the support member 13.

The flexible circuit board 15 includes a flexible board 41, an IC-mounted board 42 which is connected to one end of the flexible board 41, and the detection integrated circuit (IC) 43 serving as an integrated circuit. The detection integrated circuit 43 is mounted on the IC-mounted board 42. The other end of the flexible board 41 is arranged on the charge extracting section A of the X-ray detection panel 12, through an anisotropic conductive adhesive 44. A connector 45 is provided at one end of the IC-mounted board 42. The IC-mounted board 42 is connected to the analog circuit board 31 through the connector 45.

Furthermore, as a heat insulating member 16, it is possible to use a resin-based material or a fiber-based material which have excellent heat insulation property. The heat insulating member 16 is arranged between the X-ray detection panel 12 and the circuit board group 14. In the present embodiment, the heat insulating member 16 is held between the X-ray detection panel 12 and the support member 13. The heat insulating member 16 is bonded to the X-ray detection panel 12 and the support member 13, by an adhesive or a double-faced adhesive tape (not shown). The heat insulating member 16 has an electrical control characteristic. The heat insulating member 16 is formed into a plate shape, and has a thickness of 1 to 5 mm.

An incident window 49 is attached to the outside of the housing 46. The incident window 49 is formed of carbon fiber reinforced plastic (CFRP). The incident window 49 is arranged opposite to the X-ray detection panel 12 with a gap therebetween. The incident window 49 is superposed on the opening 46a, and connected to the housing 46. Since the incident window 49 transmits X-ray, the X-ray passes through the incident window 49, and is made incident on the X-ray detection panel 12.

A thermoplastic resin member 48 which serves as a partition member is provided between the X-ray detection panel 12 and the housing 46. The thermoplastic resin member 48 joins an outer peripheral portion of the X-ray detection panel 12 to the housing 46. In the present embodiment, the thermoplastic resin member 48 is formed in a frame-shaped as one unitary piece, without being divided into parts. The thermoplastic resin member 48 may be formed of a plurality of divided segment portions. The partition member is not limited to thermoplastic resin member 48, it may be formed in one of thermoplastic elastomer member and thermoplastic rubber member.

The shielding plate 50 is supported by the IC-mounted board 42, and opposed to and contacts a surface of the detection integrated circuit 43. The shielding plate 50 has electrical conductivity and thermal conductivity, and is grounded. In the present embodiment, the shielding plate 50 is connected to a ground line of the IC-mounted board 42. The shielding plate 50 shields an electromagnetic field which acts (or may act) on the detection integrated circuit 43.

The thermally radiative member 53 is located outside the housing 46. A part of the thermally radiative member 53 extends through the opening 46b, and is opposed to the shielding plate 50. The thermally radiative member 53 shields an electromagnetic field which leaks (or may leak) from the opening 46b.

The thermally conductive member 51 is held between the shielding plate 50 and the thermally radiative member 53. A heat insulation member 52 is held between the thermally radiative member 53 and the housing 46. The heat insulation member 52 shuts off conduction of heat from the thermally radiative member 53 to the housing 46.

A large quantity of heat is generated by the detection integrated circuit 43. The generated heat is conducted to the thermally radiative member 53 mainly by thermal conduction, through the shielding plate 50 and the thermally conductive member 51. A cooling unit is attached to the X-ray detection apparatus 11. The cooling unit can cool the thermally radiative member 53.

The cooling unit includes a thermally radiative fin 54 which is attached to the thermally radiative member 53, and a cooling fan 55 which is attached to the thermally radiative fin 54. Therefore, the heat which is conducted from the detection integrated circuit 43 to the thermally radiative member 53 is radiated to the environment (exterior) of the X-ray detection apparatus 11, by the thermally radiative fin 54 and the cooling fan 55. The heat insulation member 52 is arranged between the thermally radiative member 53 and the housing 46, to prevent the heat of the detection integrated circuit 43 from being conducted to the housing 46. Since a leakage current may flow through the thermally radiative member 53 when the thermally radiative member 53 electrically floats, the thermally radiative member 53 is grounded or electrically connected to a frame ground.

A temperature sensor (not shown) is attached to the detection integrated circuit 43 or the IC-mounted board 42 (flexible circuit board 15). The temperature sensor can measure a temperature of one of the detection integrated circuit 43 and the IC-mounted circuit 42. In the present embodiment, the temperature sensor is attached to the detection integrated circuit 43, and can measure the temperature of the detection integrated circuit 43.

The temperature sensor and the cooling fan 55 are connected with a controller (not shown). The controller can control operation of the cooling fan 55, in accordance with the temperature measured by the temperature sensor. Specifically, the controller can turn on and off the cooling fan 55, and adjust the rate of rotation of the cooling fan 55.

The X-ray detection apparatus 11 according to the above embodiment having the above structure comprises the X-ray detection panel 12, the support member 13, any circuit board in the circuit board group 14, the flexible circuit board 15 on which the detection integrated circuit 43 is mounted, the shielding plate 50, the housing 46, the connecting member 47, the thermally radiative member 53, the heat insulation member 52, and the thermally conductive member 51.

When the X-ray detection apparatus 11 operates, heat is generated by the detection integrated circuit 43. A part of the heat generated by the detection integrated circuit 43 is conducted to the air inside the housing 46. However, most of the heat generated by the detection integrated circuit 43 is conducted to members of lower temperature by thermal conduction.

Therefore, the heat generated by the detection integrated circuit 43 is conducted to the thermally radiative member 53, through the shielding plate 50 and the thermally conductive member 51. Therefore, an increase in operation temperature of the X-ray detection panel 12 due to the heat generated by the detection integrated circuit 43 can be reduced, thereby suppressing occurrence of image unevenness. On the other hand, the heat insulation member 52 is arranged between the housing 46 and the thermally radiative member 53, and thus heat of the thermally radiative member 53 is hardly conducted to the housing 46. Therefore, it is possible to suppress increase in temperature of the housing 46.

The temperature of the detection integrated circuit 43 is measured by the temperature sensor (not shown), and the controller (not shown) turns on and off or adjusts the rate of rotation of the cooling fan 55.

When the temperature of the detection integrated circuit 43 falls to a predetermined temperature or less, the controller stops (turns off) the cooling fan 55 or reduces the rate of rotation of the cooling fan 55, and thereby the electrical energy required for the cooling fan 55 can be reduced.

As a comparative example of the X-ray detection apparatus 11 according to the above embodiment, explained is the case where heat of the detection integrated circuit 43 is radiated to the housing 46. In this case, since the housing 46 has a large heat capacity, the temperature of the detection integrated circuit 43 continues to increase, even when the cooling fan 55 is turned on or the rate of rotation of the cooling fan 55 is increased after the temperature of the detection integrated circuit 43 reaches a predetermined temperature or more. In addition, when high cooling capacity is maintained by always operating the cooling fan 55 and increasing the rate of rotation of the cooling fan 55, cooling is still continued even after the temperature of the detection integrated circuit 43 decreases. In this case, the temperature of the detection integrated circuit 43 cannot be controlled with high accuracy, and electrical energy is wastefully consumed.

The detection integrated circuit 43 amplifies a minute electric current of pA level, and thus is easily influenced by external noise. The external noise which enters the thermally radiative member 53 is applied to the shielding plate 50 through the thermally conductive member 51. However, the shielding plate 50 is connected to the ground line of the IC-mounted board 42, and the noise flows into the ground line through the ground line. Therefore, influence of noise on the detection integrated circuit 43 can be reduced.

The support member 43 has electrical conductivity. Therefore, the standard potentials of the circuit boards of the circuit board group can be made equal to each other.

According to the above structure, it is possible to obtain an X-ray detection apparatus which can suppress increase in temperature of the housing 46, and reduce thermal influence that the X-ray detection panel 12 receives from the detection integrated circuit 43, without restriction of the material that forms the housing 46. In addition, the controller can control the quantity of thermal radiation, by turning on and off the cooling fan 55 and adjusting the rate of rotation of the cooling fan 55 if necessary. Therefore, it is possible to save the electrical energy required for the cooling fan 55, and control the temperatures of the detection integrated circuit 43 and the circuit boards within a range in which noise can be suppressed.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the cooling unit may not be attached to the thermally radiative member 53. In addition, the thermally radiative member 53 may be provided with a thermal conduction support member (not shown), not the cooling unit. The thermal conduction support member is connected to the thermally radiative member 53, supports the thermally radiative member 53, and has thermal conductivity. An example of the thermal conduction support member is a part of a stand of an X-ray photographic apparatus that is equipped with the X-ray detection apparatus 11. Thereby, the heat generated by the detection integrated circuit 43 can be radiated by the X-ray photographic apparatus equipped with the X-ray detection apparatus 11.

Although the above embodiment has a structure in which the shielding plate 50, the thermally conductive member 51, and the thermally radiative member 53 are arranged on the detection integrated circuit 43, they may be arranged on the circuit board of the circuit board group 14, or an IC on the circuit board group 14. For example, the shielding plate 50 may be extended to contact an IC on the circuit board group 14.

Although the above embodiment has a structure in which the temperature sensor (not shown) is attached to the detection integrated circuit 43, the detection integrated circuit 43 itself may have a temperature detection function instead.

In addition, the housing 46 may be formed of a conductor, or a material obtained by mixing an electrically conductive material with a non-conductive resin material, to prevent noise from entering the circuit board group 14 from the environment of the X-ray detection apparatus 11. Besides, a conductive paint or conductive coating may be applied to the inside or outside of the housing 46 that is made of a non-conductive resin material. In the case of adopting this structure, a material having an electromagnetic shield effect may be used for the heat insulation member 52.

On the other hand, some constituent elements among all the constituent elements shown in the above embodiment may be removed. For example, when the housing 46 is formed of a material which has thermal conductivity lower than that of aluminum, that is, when the housing 46 has thermal insulation, the heat insulation member 52 may be omitted.

Although the shielding plate 50 is supported by the flexible circuit board 15, the structure is not limited to it, but may be variously modified. For example, it suffices that the shielding plate 50 is supported by one of the support member 13, the circuit board group 14, and the flexible circuit board 15.

The X-ray detection apparatus 11 may be formed without the shielding plate 50. In the case of adopting this structure, the thermally radiative member 53 extends through the opening 46b, and is opposed to the detection integrated circuit 43 (integrated circuit). In addition, the thermally conductive member 51 is held between the detection integrated circuit 43 (integrated circuit) and the thermally radiative member 53.

The X-ray detection panel is not limited to an indirect-conversion X-ray detection panel which converts an X-ray into light and then converts the light into an electrical signal. The above effect can also be obtained by a direct-conversion X-ray detection panel which directly converts an X-ray into an electrical signal.

Embodiments of the present invention are not limited to the above X-ray detection apparatus, but may be applied to various radiation detection apparatuses such as other X-ray detection apparatuses.

What is claimed is:
1. A radiation detection apparatus comprising:
a radiation detection panel which detects a radiation;
a support member which supports the radiation detection panel on one surface thereof;
a circuit board which is supported by other surface of the support member, and drives the radiation detection panel;
a flexible circuit board which electrically connects the radiation detection panel with the circuit board, and on which an integrated circuit is mounted;
a housing which accommodates the radiation detection panel, the support member, the circuit board, and the flexible circuit board, and has thermal conductivity, and a part of which is provided with an opening;
a connecting member which is accommodated in the housing, and connected to the support member and the housing;
a thermally radiative member which is located outside the housing and extends through the opening, the thermally radiative member being opposed to the integrated circuit, and shielding an electromagnetic field that leaks from the opening;
a heat insulation member which is held between the thermally radiative member and the housing; and
a thermally conductive member which is held between the integrated circuit and the thermally radiative member.

2. The radiation detection apparatus of claim 1, further comprising:
- a temperature sensor which measures a temperature of one of the integrated circuit and the flexible circuit board;
- a cooling unit which cools the thermally radiative member; and
- a controller which controls operation of the cooling unit in accordance with the temperature measured by the temperature sensor.

3. The radiation detection apparatus of claim 1, further comprising:
- a thermal conduction support member which is connected to the thermally radiative member, supports the thermally radiative member, and has thermal conductivity.

4. A radiation detection apparatus comprising:
- a radiation detection panel which detects a radiation;
- a support member which supports the radiation detection panel on one surface thereof;
- a circuit board which is supported by other surface of the support member, and drives the radiation detection panel;
- a flexible circuit board which electrically connects the radiation detection panel with the circuit board, and on which an integrated circuit is mounted;
- a housing which accommodates the radiation detection panel, the support member, the circuit board, and the flexible circuit board, and has thermal insulation, and a part of which is provided with an opening;
- a connecting member which is accommodated in the housing, and connected to the support member and the housing;
- a thermally radiative member which is located outside the housing and extends through the opening, the thermally radiative member being opposed to the integrated circuit, and shielding an electromagnetic field that leaks from the opening; and
- a thermally conductive member which is held between the integrated circuit and the thermally radiative member.

5. The radiation detection apparatus of claim 4, further comprising:
- a temperature sensor which measures a temperature of one of the integrated circuit and the flexible circuit board;
- a cooling unit which cools the thermally radiative member; and
- a controller which controls operation of the cooling unit in accordance with the temperature measured by the temperature sensor.

6. The radiation detection apparatus of claim 4, further comprising:
- a thermal conduction support member which is connected to the thermally radiative member, supports the thermally radiative member, and has thermal conductivity.

* * * * *